US006912763B2

(12) United States Patent
Kovar

(10) Patent No.: US 6,912,763 B2
(45) Date of Patent: Jul. 5, 2005

(54) CLAMPING CONNECTION FOR INTERCHANGEABLE MANDREL AND DRIVE SHAFT OF RIVETING TOOL AND USE OF THAT CLAMPING CONNECTION FOR HAND HELD RIVETING TOOLS

(75) Inventor: Martin Kovar, Nachod (CZ)

(73) Assignee: Masterfix Products B.V. (NL)

( * ) Notice: Subject to any disclaimer, the term of this patent is extended or adjusted under 35 U.S.C. 154(b) by 58 days.

(21) Appl. No.: 10/367,779

(22) Filed: Feb. 19, 2003

(65) Prior Publication Data

US 2004/0020024 A1 Feb. 5, 2004

(30) Foreign Application Priority Data

Feb. 18, 2002 (CZ) ........................................ 2002-12840

(51) Int. Cl.$^{7}$ .......................... B21J 15/04; B21L 15/04; B23P 11/00

(52) U.S. Cl. .................................. 29/243.527; 72/391.4

(58) Field of Search ..................... 29/243.521, 243.526, 29/243.527; 72/114, 391.4, 391.8

(56) References Cited

U.S. PATENT DOCUMENTS

| | | | | | |
|---|---|---|---|---|---|
| 2,384,037 | A | * | 9/1945 | Kugler | 29/243.526 |
| 3,406,557 | A | * | 10/1968 | Harris | 29/243.521 |
| 4,648,259 | A | | 3/1987 | Pendleton | |
| 4,878,372 | A | | 11/1989 | Port et al. | |
| 4,896,522 | A | | 1/1990 | Rosier | |
| 5,079,818 | A | * | 1/1992 | Schwab | 29/243.527 |
| 5,323,521 | A | * | 6/1994 | Freund et al. | 29/243.527 |
| 5,357,666 | A | | 10/1994 | El Dessouky et al. | |
| 5,359,762 | A | * | 11/1994 | Liu | 29/243.527 |
| 5,452,505 | A | | 9/1995 | Gasser | |
| 5,771,738 | A | * | 6/1998 | Ko | 72/391.8 |
| 6,182,345 | B1 | | 2/2001 | Travis | |
| 6,449,822 | B1 | | 9/2002 | Gilbert et al. | |

FOREIGN PATENT DOCUMENTS

| | | | |
|---|---|---|---|
| DE | 39 17 507 | A1 | 2/1991 |
| FR | 2 660 886 | A1 | 10/1991 |

* cited by examiner

*Primary Examiner*—David Jones
(74) *Attorney, Agent, or Firm*—Harness, Dickey & Pierce, P.L.C.

(57) ABSTRACT

The invention concerns a clamping connection for an interchangeable mandrel (1) and drive shaft (13) of a riveting tool. The connection comprises a connecting casing (15) to which the end of the drive shaft (13) is fastened on one side, while on the other side there is an open cavity in the casing (15), adapted for inserting the end of the interchangeable mandrel (1), in a transverse direction, until its expanded end part is inside the cavity and its axis lies along the axis of the drive shaft (13) and the casing (15), where the interchangeable mandrel (1) in this position is moveable in the direction of the common axis by the action of a pressure element across engaging, rolling surfaces arranged on the front surface of the expanded end part of the interchangeable mandrel (1) and on the adjacent surface of the pressure element, to the clamped position where the interchangeable mandrel (1) is gripped by its expanded end part in the cavity of the casing (15) by means of a correspondingly shaped surface, arranged in the cavity of the casing (15), with the possibility of axial movement and secured against rotation.

19 Claims, 4 Drawing Sheets

CLAMPING CONNECTION FOR INTERCHANGEABLE MANDREL AND DRIVE SHAFT OF RIVETING TOOL AND USE OF THAT CLAMPING CONNECTION FOR HAND HELD RIVETING TOOLS

FIELD OF THE INVENTION

The invention involves a clamping connection for an interchangeable mandrel and drive shaft of a riveting tool and use of that clamping connection for hand-held riveting tools.

DESCRIPTION OF THE PRIOR ART

The mandrels for nut and screw rivets are generally securely tightened with a key to the front stop of riveting tools, either to the lock nut or to the shoulder on the traction mandrel of the riveting tool. Tightening is necessary so that spontaneous loosening from the traction mandrel does not occur. This tightening operation requires a certain amount of time and equipment (keys) all of which lengthens the time taken in changing mandrels.

This situation is definitely improved by the arrangement whereby the traction mandrel is furnished with a traction casing freely positioned in a changeable casing, these casings being mutually secured against rotating. Between it and the peripheral shoulder of the traction casing there is a pressure spring. The traction casing is furnished with an inner thread to which a pin is screwed, the collar of which is furnished on its outer perimeter with at least one bevelled surface, which is complementary in shape to the inner peripheral surface of the adjacent part of the changeable casing. The equipment is positioned together with the traction mandrel in the nozzle of the riveting tool, which has a through opening in the area of the changeable casing. The pressure spring is positioned against a lock-nut, screwed on to the traction mandrel. The securing of the axial thrust of the changeable casing with respect to the traction casing is accomplished by means of a securing ring, fixed in a recess of the changeable casing and resting against the stepped end of the traction casing.

The advantage of this solution is that if it is not necessary to use a tightening tool (key), it is possible to change the mandrels for nut and screw rivets on riveting tools easily and very quickly. The construction is however fairly complicated and increases production expenses for the riveting tool.

SUMMARY OF THE INVENTION

The disadvantages of the present situation are to a considerable degree removed by the new arrangement of the clamping connection for an interchangeable mandrel and drive shaft of a riveting tool and use of that clamping connection for hand-held riveting tools. The clamping connection for an interchangeable mandrel and drive shaft of a riveting tool comprises a connecting casing to which the end of the drive shaft is fastened on one side, while on the other side there is an open cavity in the casing, adapted for inserting the end of the interchangeable mandrel, in a transverse direction, until its expanded end part is inside the cavity and its axis lies along the axis of the drive shaft and the casing. The interchangeable mandrel in this position is moveable in the direction of the common axis by the action of a pressure element across engaging, rolling surfaces arranged on the front surface of the expanded end part of the interchangeable mandrel and on the adjacent surface of the pressure element, to the clamped position where the interchangeable mandrel is gripped by its expanded end part in the cavity of the casing by means of a correspondingly shaped surface, arranged in the cavity of the connecting casing, with the possibility of axial movement and secured against rotation.

The advantage of this solution is basically the speed and ease with which the mandrel is changed for one of another size. For transfer of the drive force there is no threaded connection between the mandrel and the casing which slows down the change. All of this makes possible an increase in productivity during riveting and reduces preparation time.

The cavity of the casing is a through cavity and has a cylindrical part furnished with a thread for screwing on the drive shaft, which cylindrical part is stepped down on the inside to a smaller diameter. A stopping surface is thus created for the contacting pressure element. The cylindrical part of the cavity joins the part with the rectangular section for guiding the interchangeable mandrel, which also has a rectangular section in its corresponding part. The passage between these two parts of the cavity is arranged as a stop for the correspondingly shaped contact surface of the expanded end part of the interchangeable mandrel. The casing at the same time is furnished with a radial slot reaching into its cavity, which runs the length of the casing and in part of the cavity with the rectangular section has basically the same rectangular section and then expands so that its width is greater by its clearance than the section of the expanded end part of the interchangeable mandrel. The length of the part of the interchangeable mandrel with rectangular section is greater than the distance of the free end of the casing from the expansion of its radial slot.

This arrangement facilitates and speeds up the insertion of the interchangeable mandrel into the cavity of the connecting casing and also its withdrawal.

The pressure element, in one of its possible embodiments, can comprise a pressure spring, located in the axial recess of the drive shaft together with a pressure pin, the end of which, reaching into the cavity of the casing, has an expansion in the shape of a head with front rolling surface, where the head in its withdrawn end position reaches the seat formed by the shaped shoulder in the cavity of the casing. The head of the pressure pin can be spherical.

In another embodiment of this invention the pressure element can comprise a pressure spring, located in the cavity of the casing and fitting tightly against a ball, freely positioned in this cavity of the casing, which in its withdrawn end position reaches the seat formed by the shaped shoulder in the cavity of the casing, the diameter of the ball being greater than the width of the transverse radial slot of the casing.

The interchangeable mandrel can be formed with a pin at one end furnished with a thread for connecting with the rivet and at the other end with a terminal clamping head, which on the side adjacent to the shaft of the pin has an engaging surface, basically vertical to the axis of the pin, and on the other side a spherical rolling surface, while for part of its length the pin is furnished with a bilateral shoulder running symmetrically in the direction of the axis, so that in this part it has a basically rectangular section, corresponding to the rectangular section of part of the cavity of the casing in which, in the clamped position during operation of the riveting tool, it is slidingly but not rotatingly guided.

The subject of the invention is also the use of the said clamping connection for hand-held riveting tools, where the casing with interchangeable mandrel is placed in the front nozzle, to which is fixed an interchangeable extension with staying front surface for riveting, and together with the nozzle is tightly inserted in the extension of the sliding pressure mandrel, which is arranged for engagement with the controlling levers of the tool.

BRIEF DESCRIPTION OF THE DRAWINGS

For a clearer explanation, an example of an embodiment of this technical solution is illustrated in the attached drawings and is described in detail in the text that follows.

FIG. 2' is a view of FIG. 2 with the casing 15 shown in cross-section.

EXAMPLES OF PREFERRED EMBODIMENTS

Figure 1:
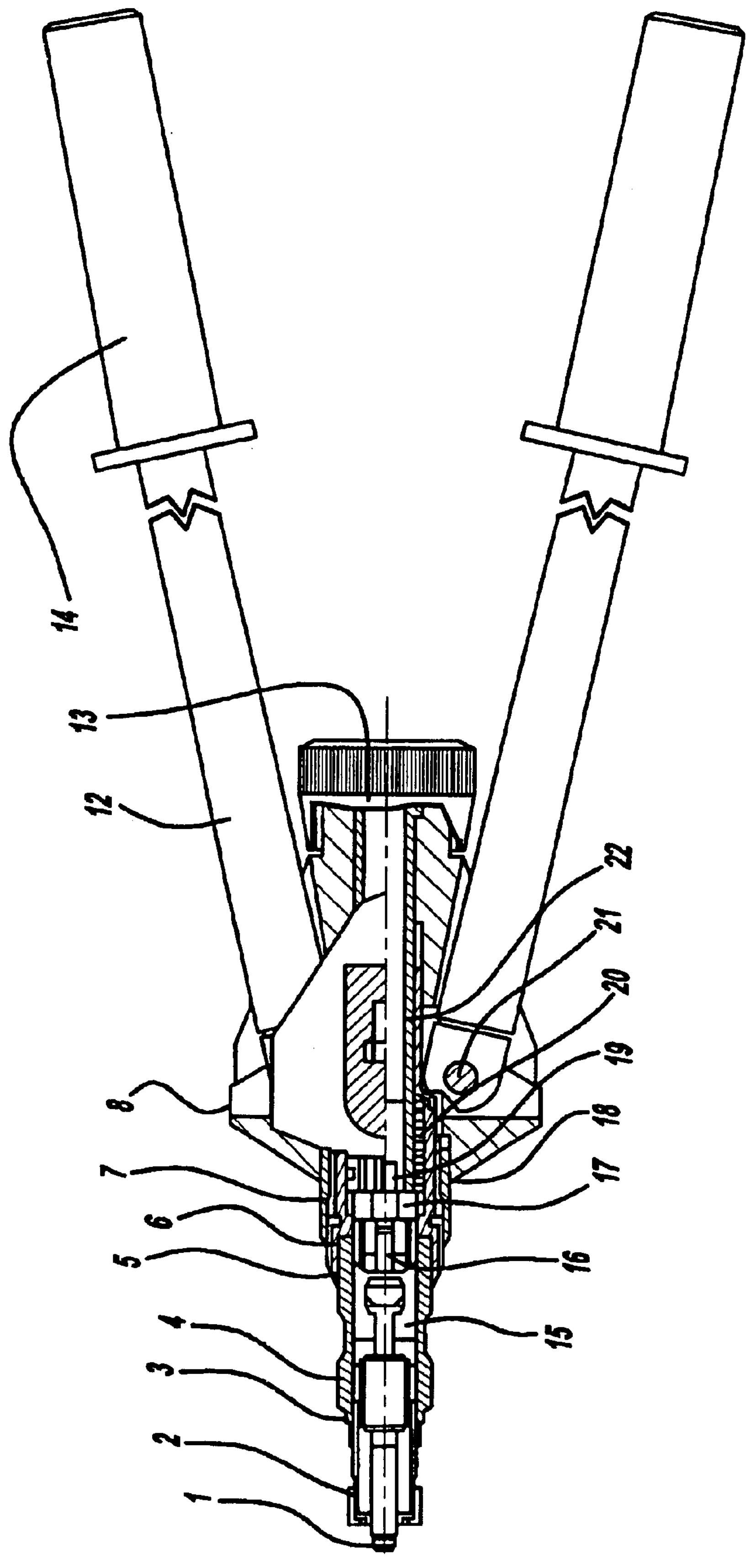
In FIG. 1 is a schematic illustration in partial section of the arrangement of a hand-held riveting tool for nut and screw rivets with clamping connection for an interchangeable mandrel and drive shaft of a riveting tool.
Figure 2:
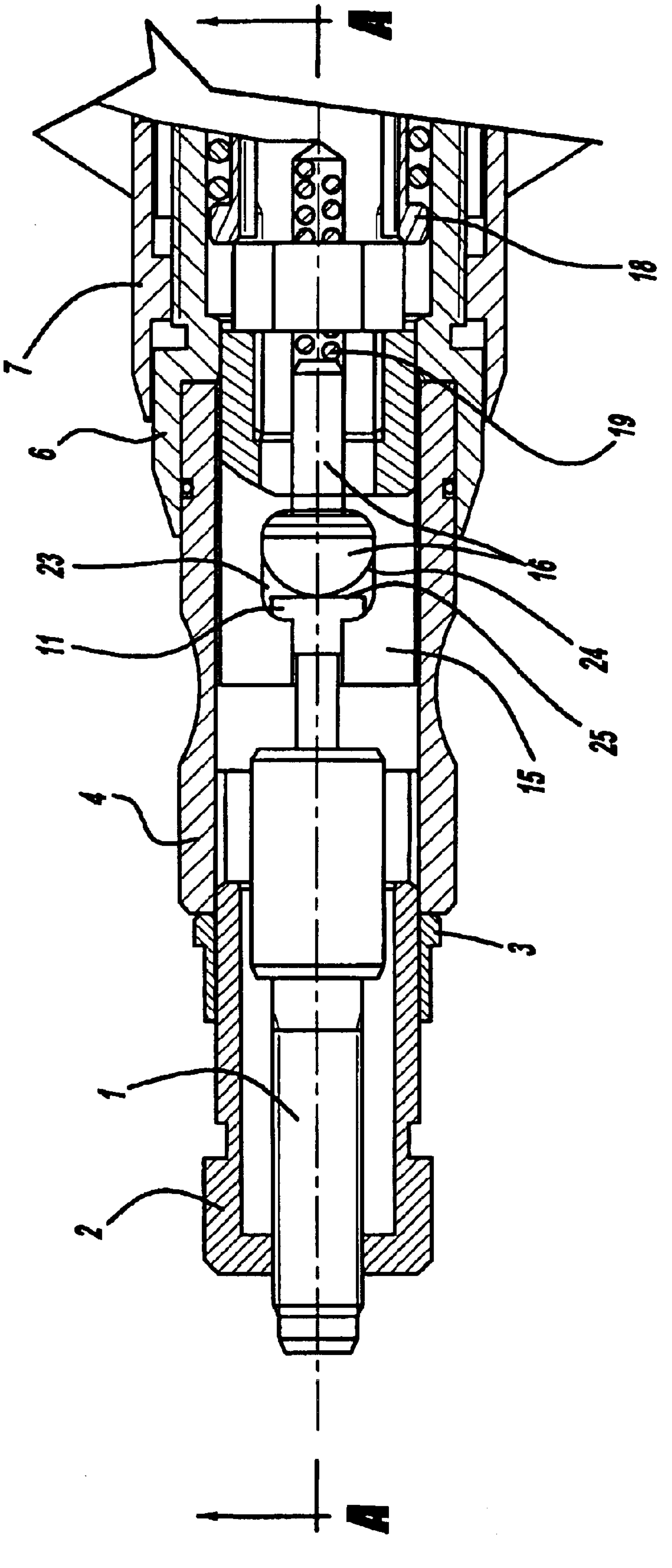
FIG. 2 is a larger scale detailed view of the clamping connection.
Figure 2:
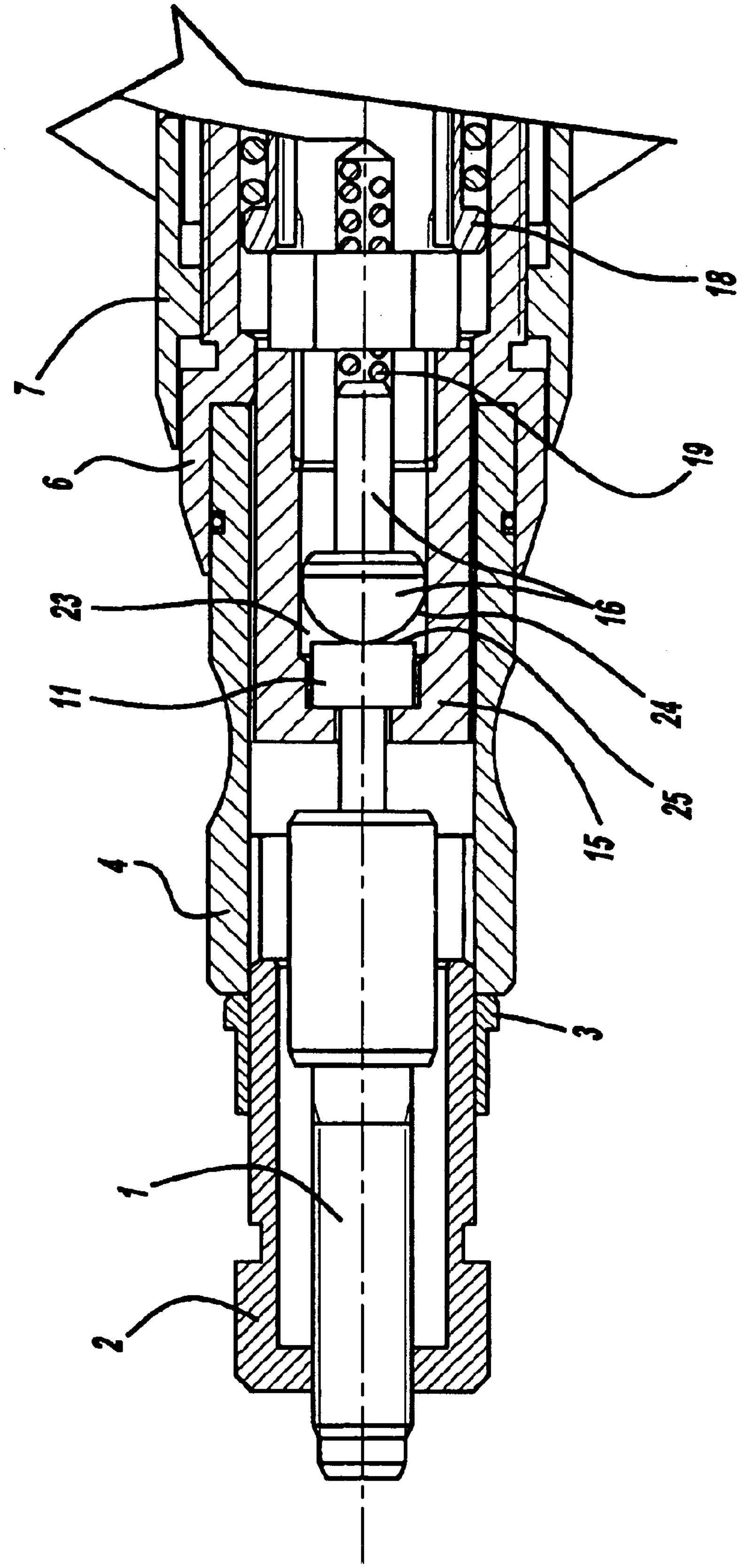
Figure 3:
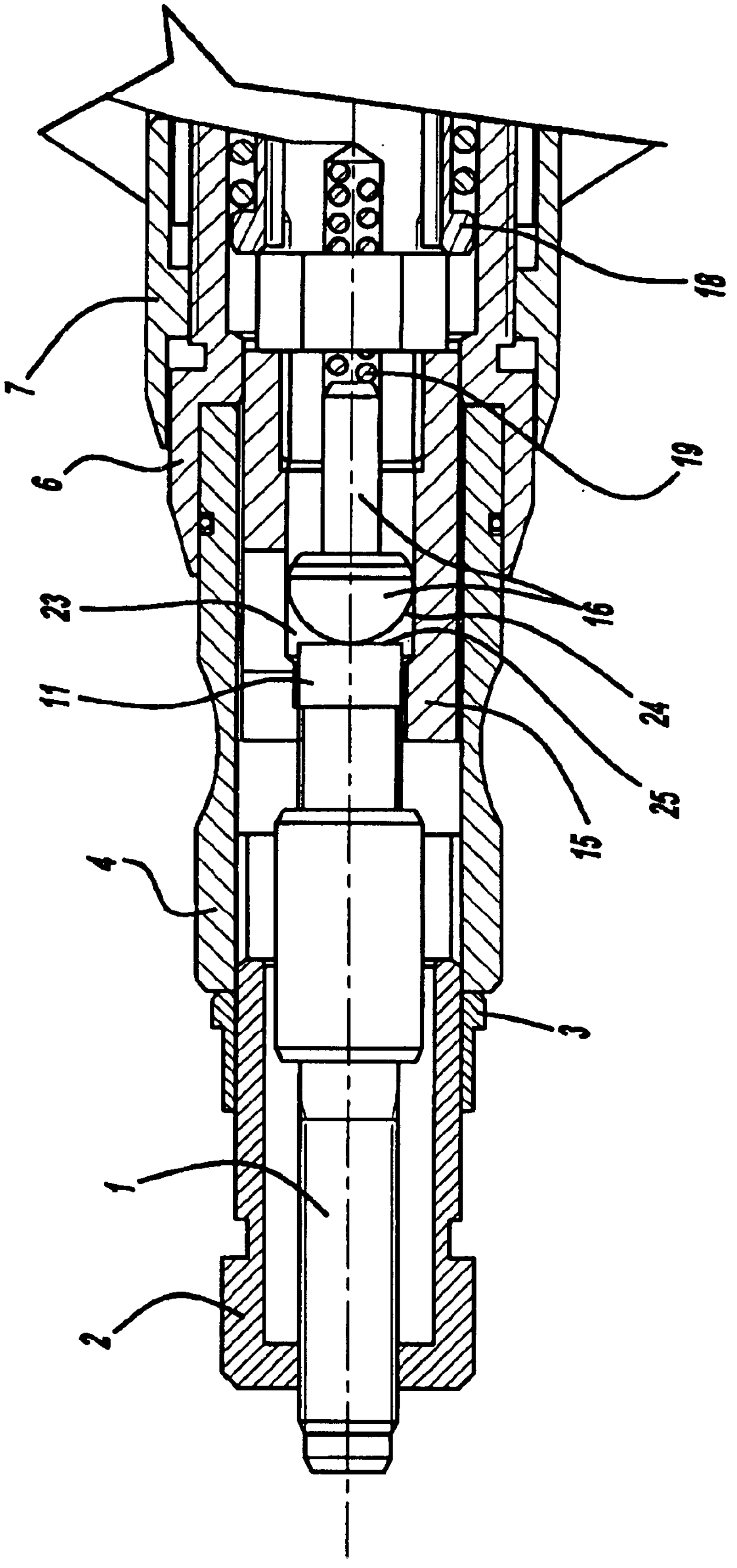
FIG. 3 is a view along the line A—A of FIG. 2.

A tube passes through the plastic body 8 of the hand-held riveting tool (it can be pressed in or freely inserted), the tube having a thread at its outer end, onto which a nut 18 is screwed. A drive shaft 13 passes through the inside of the tube, having on its back end a screwed-on nut causing the rotating movement of the drive shaft for the purpose of screwing or unscrewing the nut or screw rivet to/from the interchangeable mandrel 1 in the front part of the tool (the interchangeable mandrel 1 is intended for screwing or unscrewing nut or screw rivets of various sizes). The purpose of the drive shaft 13 is to transfer the drive force from the rivet (during riveting) and also, as already mentioned, to turn the interchangeable mandrel 1. In the front part there can be an axial opening in the drive shaft 13 for positioning the pressure spring 19. The shaft of the pressure pin 16 goes into this axial opening (approx. 30 mm in length) and fits tightly with one of it ends against the pressure spring 19, the opposite outer end being rounded or slanted (instead of this pin 16 there can be a ball).

A lock nut 17 is screwed to the drive shaft 13 passing through the body 8 of the tool, and fits closely against the connecting casing 15. This casing 15 has on its front surface a shaped, basically rectangular slot which passes into the cavity 23 of the casing 15 in which the pressure pin 16 (or ball) with rounded or slanted end 24 is situated. This end is adjacent to the inner shoulder of the cavity 23 of the casing 15, to which the pressure pin 16 is pressed by the pressure spring 19.

The shaped slot with the cavity 23 of the casing 15 is adapted for the free insertion of the interchangeable mandrel 1. The cylindrical cavity of the connecting casing 15, which at one end is furnished with an inner thread for screwing on the drive shaft 13, at the opposite end first of all contracts and thus forms a rounded surface for coming into contact with the expanded end part of the pressure pin 16, which corresponds in shape, and then passes into the part of the cavity basically rectangular in section, corresponding to the section of the shoulder of the interchangeable mandrel 1. At this end of the connecting casing 15 its cavity in the transverse direction is opened by the slot which runs through the wall of the casing 15 for the whole length of the stepped part of the rectangular-section cavity, and then the slot expands into an oval shape, lengthwise in the direction of the axis, whose width corresponds to the size of the radius of the expanded end part 11 of the interchangeable mandrel 1 (its clamping head). The head of the pressure element (the radius of the ball in the case of an expanded head of the pressure pin 16 with front rolling surface 24) is greater than the width of the oval-shaped slot of the casing 15. The interchangeable mandrel 1 is formed of a pin at one end furnished with a thread for connecting to the rivet, and at the other end a terminal clamping head, which on the side adjacent to the shaft of the pin has a contact surface 25 basically vertical to the axis of the pin, and on the other side a spherical rolling surface. On part of its length the pin has a bilateral shoulder running symmetrically in the direction of the axis, so that in this part it has a basically rectangular section, corresponding to the rectangular section of the part of the cavity 23 in the casing 15 in which, in the clamped position during the operation of the riveting tool, it is slidingly but not rotatingly guided. After insertion into the casing 15, the interchangeable mandrel 1 cannot rotate with respect to the casing 15.

The pressure mandrel 22 is slidingly positioned on the tube passing through the plastic body 8 of the hand-held riveting tool. An outer shoulder is formed on the pressure mandrel 22, into which are fitted the shaped ends of the two levers 12 of the riveting tool, which have handles 14 and are fastened on pins 21 positioned in the plastic body 8. An extension 6 of this pressure mandrel 22 (the extension 6 can also be an integral part of the pressure mandrel 22) is screwed into the outer end of the pressure mandrel 22. A front nozzle 4 is freely put onto (inserted into) the extension 6 through a securing O-ring 5, which is situated in its outer recess. Screwed to the front nozzle 4 is an interchangeable extension 2 with lock-nut 3 through which the outwardly protruding interchangeable mandrel 1 freely passes. A nut 7 for regulating the stroke of the pressure mechanism is screwed to the extension 6, the back part of this nut 7 forming an adjustable stop for the pressure mechanism with respect to the plastic body 8 of the hand-held riveting tool and a setting for the stroke of the pressure mechanism. In the space between the nut 18 screwed to the tube in the body 8 of the tool and the pressure mandrel 22, there is a reversible spring 20 which serves to return the pressure mechanism to the original position.

On breakdown of the interchangeable mandrel 1 (wear and tear occurs during riveting), the front nozzle 4 is pulled out of the extension 6, the interchangeable mandrel 1 comes out of the casing 15 (after pressing the mandrel 1 on the front of the casing 15) and after changing, the front nozzle 4 is again placed in the extension 6. In changing the mandrel 1 for another size, the front nozzle 4 is pulled out in the same way from the extension 6 and the mandrel 1 is changed for another one. The interchangeable extension 2, together with the lock-nut 3, is unscrewed from the front nozzle 4, it is exchanged for another interchangeable extension 2 with lock-nut 3 and the whole is inserted once more.

The advantage of this solution is basically the speed and ease with which the mandrel 1 is exchanged for another size. For transfer of the drive force there is no threaded connection between the mandrel 1 and the casing 15 which slows down the change. All of this makes possible an increase in productivity during riveting and reduces preparation time.

INDUSTRIAL USE

The clamping connection according to this invention can be used in hand-held riveting tools, but also in pneumatic-hydraulic riveting tools in which the drive force is produced by the pressure of a hydraulic piston. In these embodiments the pressure spring of the pressure element can also be a pneumatic spring for example.

What is claimed is:

1. A clamping connection for an interchangeable mandrel and a drive shaft of a riveting tool comprising a connecting casing to which an end of the drive shaft is fastened on a first side, while on a second side there is an open cavity in the casing adapted for inserting an end of the interchangeable mandrel in a transverse direction until an expanded end part of the interchangeable mandrel is inside the cavity and an axis of the interchangeable mandrel lies along a common axis of the drive shaft and the casing, the interchangeable mandrel in this position being moveable in the direction of the common axis by the action of a pressure element across engaging, rolling surfaces arranged on a front surface of the expanded end part of the interchangeable mandrel and on an adjacent surface of the pressure element, to a clamped position wherein the expanded end part of the interchangeable mandrel is gripped in the cavity of the casing by a correspondingly shaped surface, arranged in the cavity of the casing, whereby the interchangeable mandrel may have axial movement and secured against rotation.

2. A clamping connection according to claim 1, wherein the cavity of the casing extends through the casing and wherein the cavity has a cylindrical part furnished with a thread for screwing on the drive shaft, which cylindrical part is stepped down on the inside to a smaller diameter, thereby creating a stopping surface for the pressure element, the cylindrical part of the cavity joining a part of the cavity with a rectangular section for guiding the interchangeable mandrel, the interchangeable mandrel having a rectangular section in a corresponding part, a portion of the cavity between the cylindrical part and the part of the cavity with the rectangular section being arranged as a stop for a correspondingly shaped contact surface of the expanded end part of the interchangeable mandrel, and the casing having a radial slot reaching into the cavity, the radial slot running the length of the casing and in the part of the cavity with the rectangular section, the radial slot has basically the same rectangular configuration and then the radial slot expands so that its width is greater than the width of the section of the expanded end part of the interchangeable mandrel, with the length of the part of the interchangeable mandrel with the rectangular section being greater than the length of the casing from the expansion of the radial slot to the end of the casing on the second side.

3. A clamping connection according to claim 1, wherein the pressure element comprises a pressure spring, located in an axial recess of the drive shaft together with a pressure pin, an end of the pressure pin reaching into the cavity of the casing and having an expansion shaped as a head with a front rolling surface, the head in a withdrawn end position reaching a seat formed by a shaped shoulder in the cavity of the casing.

4. A clamping connection according to claim 2, wherein the pressure element comprises a pressure spring, located in the cavity of the casing and fitting tightly against a ball, freely positioned in the cavity of the casing, in a withdrawn end position said ball reaches a seat formed by a shaped shoulder in the cavity of the casing, the ball having a diameter that is greater than the width of the radial slot of the casing.

5. A clamping connection according to claim 3, wherein the head of the pressure pin is generally spherical.

6. A clamping connection according to claim 2, wherein the interchangeable mandrel is formed with a pin at one end furnished with a thread for connecting with a rivet and wherein the interchangeable mandrel is furnished at the other end with a terminal clamping head, which on a side adjacent to a shaft of the pin has an engaging surface, generally vertical to the axis of the pin, and on the other side the terminal clamping head has a spherical rolling surface, while for part of its length the pin is furnished with a bilateral shoulder running symmetrically in the direction of the axis, with generally a rectangular section, corresponding to the rectangular section of the part of the cavity of the casing in which, in the clamped position during operation of the riveting tool, the interchangeable mandrel may have axial movement and is secured against rotation.

7. A clamping connection according to claim 1, wherein the casing with the interchangeable mandrel is placed in a front nozzle, to which is fixed an interchangeable extension and together with the nozzle is tightly inserted in the extension of a sliding pressure mandrel, which is arranged for engagement with controlling levers of the tool.

8. A clamping connection according to claim 2, wherein the pressure element comprises a pressure spring, located in an axial recess of the drive shaft together with a pressure pin, an end of the pressure pin reaching into the cavity of the casing and having an expansion shaped as a head with a front rolling surface, the head in a withdrawn end position reaching a seat formed by a shaped shoulder in the cavity of the casing.

9. A clamping connection according to claim 3, wherein the interchangeable mandrel is formed with a pin at one end furnished with a thread for connecting with a rivet and wherein the interchangeable mandrel is furnished at the other end with a terminal clamping head, which on a side adjacent to a shaft of the pin has an engaging surface, generally vertical to the axis of the pin, and on the other side the terminal clamping head has a spherical rolling surface, while for part of its length the pin is furnished with a bilateral shoulder running symmetrically in the direction of the axis, with generally a rectangular section, corresponding to the rectangular section of the part of the cavity of the casing in which, in the clamped position during operation of the riveting tool, the interchangeable mandrel may have axial movement and is secured against rotation.

10. A damping connection according to claim 4, wherein the interchangeable mandrel is formed with a pin at one end furnished with a thread for connecting with a rivet and wherein the interchangeable mandrel is furnished at the other end with a terminal clamping head, which on a side adjacent to a shaft of the pin has an engaging surface, generally vertical to the axis of the pin, and on the other side the terminal clamping head has a spherical rolling surface, while for part of its length the pin is furnished with a bilateral shoulder running symmetrically in the direction of the axis, with generally a rectangular section, corresponding to the rectangular section of the part of the cavity of the casing in which, in the clamped position during operation of the riveting tool, the interchangeable mandrel may have axial movement and is secured against rotation.

11. A clamping connection according to claim 5, wherein the interchangeable mandrel is formed with a pin at one end furnished with a thread for connecting with a rivet and wherein the interchangeable mandrel is furnished at the other end with a terminal clamping head, which on a side adjacent to a shaft of the pin has an engaging surface, generally vertical to the axis of the pin, and on the other side the terminal clamping head has a spherical rolling surface, while for part of its length the pin is furnished with a bilateral shoulder running symmetrically in the direction of the axis, with generally a rectangular section, corresponding to the rectangular section of the part of the cavity of the casing in which, in the clamped position during operation of the riveting tool, the interchangeable mandrel may have axial movement and is secured against rotation.

12. A clamping connection according to claim 2, wherein the casing with the interchangeable mandrel is placed in a front nozzle, to which is fixed an interchangeable extension and together with the nozzle is tightly inserted in the extension of a sliding pressure mandrel, which is arranged for engagement with controlling levers of the tool.

13. A clamping connection according to claim 3, wherein the casing with the interchangeable mandrel is placed in a front nozzle, to which is fixed an interchangeable extension and together with the nozzle is tightly inserted in the extension of a sliding pressure mandrel, which is arranged for engagement with controlling levers of the tool.

14. A clamping connection according to claim 4, wherein the casing with the interchangeable mandrel is placed in a front nozzle, to which is fixed an interchangeable extension and together with the nozzle is tightly inserted in the extension of a sliding pressure mandrel, which is arranged for engagement with controlling levers of the tool.

15. A clamping connection according to claim 5, wherein the casing with the interchangeable mandrel is placed in a front nozzle, to which is fixed an interchangeable extension and together with the nozzle is tightly inserted in the extension of a sliding pressure mandrel, which is arranged for engagement with controlling levers of the tool.

16. A clamping connection according to claim 6, wherein the casing with the interchangeable mandrel is placed in a front nozzle, to which is fixed an interchangeable extension and together with the nozzle is tightly inserted in the extension of a sliding pressure mandrel, which is arranged for engagement with controlling levers of the tool.

17. A clamping connection for an interchangeable mandrel and drive shaft of a riveting tool, comprising:

a connecting casing, a first end of the drive shaft being fastened to one side of the connecting casing, the connecting casing having a cavity, the cavity of the connecting casing being adapted to receive the end of the interchangeable mandrel whereby the interchangeable mandrel may move axially along the cavity of the connecting casing and is prevented from rotational movement relative to the connection casing when the interchangeable mandrel is received by the cavity of the connecting casing, the connecting casing having a pressure element which urges the interchangeable mandrel into engagement with said cavity of the connecting casing.

18. The clamping connection of claim 17, wherein the interchangeable mandrel is moved axially against the pressure part to disengage the interchangeable mandrel from the connection casing.

19. The clamping connection of claim 18, wherein the interchangeable mandrel is prevented from radial movement relative to the connection casing while the interchangeable mandrel is in engagement with said cavity of the connection casing.

* * * * *